March 20, 1934.    J. A. A. DE VIZCAYA    1,951,863
VEHICLE BODY
Filed Nov. 7, 1931
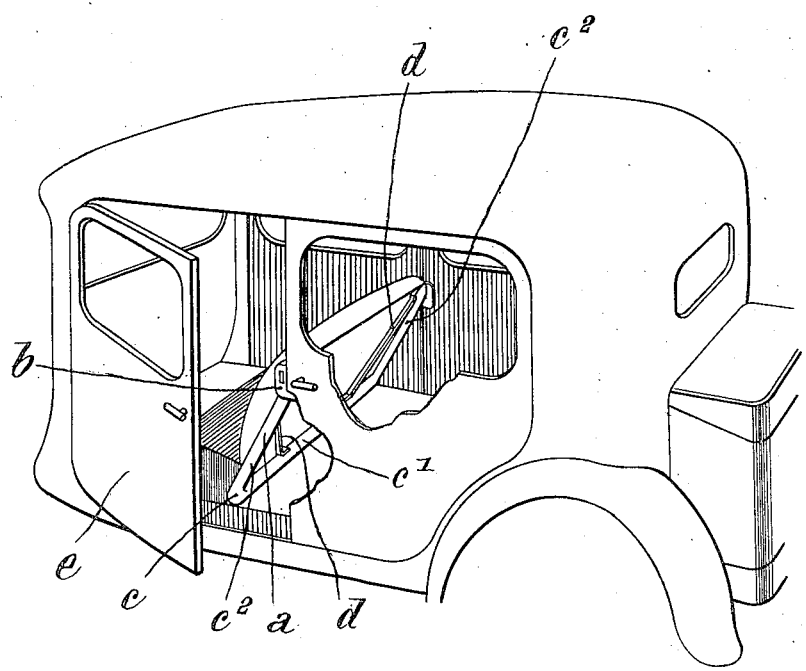
Jean Antoine Augustin de Vizcaya
Inventor
by Louis Barnett
Attorney.

Patented Mar. 20, 1934

1,951,863

UNITED STATES PATENT OFFICE 1,951,863

VEHICLE BODY

Jean Antoine Augustin de Vizcaya, Villa le Haras, Chaville, France

Application November 7, 1931, Serial No. 573,580
In Belgium November 10, 1930

2 Claims. (Cl. 296—1)

The invention relates to vehicle bodies which comprise at least two juxtaposed doors, each of the doors corresponding to a row of seats and more particularly but not exclusively to closed bodies for automobiles having four doors.

It has for its principal object to facilitate access into the interior of the bodies.

According to the invention, the hinges of the two doors of the body come on the sides remote from their adjacent sides and the member to be engaged by the door locks is carried by a frame fixed at its lower part and such that the said member is supported so as to overhang, and leave below it, a free space of increasing width, which is available for entry and exit.

In order that the invention may be better understood it will now be described with reference to the accompanying drawing which is given by way of example and the single figure of which represents, in perspective with parts removed, an automobile body constructed according to one method of carrying the invention into effect.

The body, with the exception of elements $a$ carrying the parts $b$, to be engaged by the door locks, and with the exception of the doors, is constructed in any usual appropriate manner and with the hinges of the doors remote from the sides which come adjacent, that is to say, in the case considered of a body with four doors, with the hinges at the front and the rear of the said body.

The two elements $a$ are each formed by a frame inclined from top to bottom, from the rear towards the front, the said frame only being fixed to the rest of the vehicle by its lower part, and with advantage attached to the back of the front seats according to the inclination of the said back. This frame preferably is so disposed on the interior of the body, that it is only in firm contact with the doors by its members $b$ and as shown on the drawing, the elements $a$ are formed in such manner that they are limited in height by that of the members $b$.

For example, the said elements are formed from a frame $c$ of metallic tube or the like, which comprises a lower horizontal side or cross piece $c^1$, having a length substantially equal to the width of the body, and two lateral arms $c^2$, the said arms forming the elements $a$ themselves.

The frame $c$ is firmly fixed to the chassis of the vehicle, in such a position that on the one hand, the arms $c^2$ are inclined and disposed as has been indicated, and on the other hand, the members $b$ which are fixed to the extremities of the arms $c^2$ come in appropriate positions, and substantially opposite the centre of the height of the doors.

With advantage, the arms $c^2$ are made rigid either by struts $d$ connecting the said arms $c^2$ to the cross-piece $c^1$, or by making them integral with the frame constituting the back of the front seats, or in any other suitable manner.

The doors $e$ on the exterior have any appropriate form, and may have a regular contour, a housing then being formed on the interior of the front doors, to accommodate the arms $c^2$ and the members $b$, this arrangement, in order to utilize with profit the whole width of the lower part of the rear opening, necessitating the opening of the two doors.

In another arrangement, the front door is shaped or formed with a cut-away part in accordance with the position of the arms $c^2$, and the rear door has a projecting part, precisely corresponding to the said cut-away part. Thus, when the doors are closed, their juxtaposed sides fit exactly, this second arrangement permitting the whole width of the lower part of the rear opening to be utilized with profit without the necessity of opening the front door.

It will be understood that adequate clearance is left between the doors and their frame, and between the doors themselves to permit the desired relative movements between these parts. The said clearance is with advantage filled by an elastic packing formed, for example, by a rubber tube covered with leather, which permits relative displacements, and silences vibrations, jars, shocks etc. and gives tightness to air, water, dust etc.

A body so constructed is such that access of travellers into its rear part is facilitated by the fact of the addition, to the rear entry space, of a supplementary triangle, bounded by the frame $a$, the vertical dropped from the member $b$, and the floor. In other words, from the fact that the vertical standard which automobile vehicles ordinarily comprise is done away with (at least that part coming below the member $b$) and replaced by the frame $a$, inclined from top to bottom, from the rear towards the front, for the length of the lateral angle at the rear of the back portion of the front seat.

The two doors being open, or even the rear door alone, in the case of the second described arrangement of the doors $f$, the ascent and descent of travellers from the rear part of the vehicle can be effected without the necessity of turning sideways as much as is necessary in the case of a vehicle with an intermediate standard running from top to bottom, which procures for travellers very appreciable comfort.

For the same reason, after the removal of the two doors and of the front seat, the operations necessitated for inspection, maintenance, dismounting, repairs, etc. of the parts of the chassis situated under the floor of the vehicle are rendered much more convenient.

Furthermore, the method of fixing the doors (front or rear) at three points (the two hinges and the lock) and that without an intermediate standard, permits a free deformability of the whole, all the more so as the arm $c^2$ is separate from the doors. In effect, the locks being supported by a member fixed to the chassis in the neighbourhood of the middle of this latter and being located towards the central position of the height of the doors constitute a point of attachment, to some extent a sort of knuckle joint, located at the centre of the deformations of each side panel. These panels are thus completely triangulated in their plane, and moreover there is no intermediate standard connecting the roof to the base in the position where the distance apart of these portions should be able to vary when the body is deformed, which is a considerable advantage.

The invention is not limited to the forms described nor to the constructional embodiments of the various parts which have been more particularly indicated, but includes all variations, especially that where the arms $c^2$ are prolonged towards the top by a false standard not rigidly fixed to the roof of the body but through any deformable system, which may be sliding, resilient or otherwise, the rear door having below the part $a$ a portion projecting from the said standard and of the same width and the front door a corresponding recess, in such a way that the whole presents the appearance inherent to vehicles with intermediate standards, and possesses nevertheless the greater part of the advantages set forth relative to the present invention.

What I claim and desire to secure by Letters Patent of the United States of America is:—

1. A closed vehicle body provided with lateral door openings, a pair of adjacent doors hingedly mounted to swing toward one another into closed position, said doors extending the full height of the lateral door opening in which they are mounted and being dimensioned to occupy the whole of one of the lateral openings in the vehicle body, latches mounted on each of said doors, lock engaging means adapted to coact with said latches and a frame secured adjacent the lower part of said body, said frame being formed and positioned to support said lock engaging means in a rearwardly overhanging position, whereby free passage of increased width is provided adjacent one of the doors to facilitate entry and exit therethrough.

2. A closed vehicle body provided with lateral door openings and a seat, a pair of adjacent doors hingedly mounted to swing toward one another into closed position, said doors extending the full height of the lateral door opening in which they are mounted and being dimensioned to occupy the whole of one of the lateral openings in the vehicle body, latches mounted on each of said doors, a frame comprising a base portion secured adjacent the bottom of the back side of the seat and two spaced arms extending upwardly from said base portion, and means carried by one of said arms for engaging both of the latches of each of said doors.

JEAN ANTOINE AUGUSTIN DE VIZCAYA.